United States Patent
Xie et al.

(10) Patent No.: US 11,141,807 B2
(45) Date of Patent: *Oct. 12, 2021

(54) WIRE AUTOMATIC SOLDERING SYSTEM

(71) Applicants: Tyco Electronics (Shanghai) Co. Ltd., Shanghai (CN); TE Connectivity Services GmbH, Schaffhausen (CH); Measurement Specialties (Chengdu) Ltd., Chengdu (CN); Shenzhen AMI Technology Co., Ltd., Shenzhen (CN)

(72) Inventors: Fengchun Xie, Shanghai (CN); Dandan Zhang, Shanghai (CN); Roberto-Francisco Yi Lu, Bellevue, WA (US); Lvhai Hu, Shanghai (CN); Qinglong Zeng, Shenzhen (CN); Lan Gong, Chengdu (CN); Qian Ying, Chengdu (CN); Yingcong Deng, Shanghai (CN); Yun Liu, Shanghai (CN)

(73) Assignees: Tyco Electronics (Shanghai) Co. Ltd., Shanghai (CN); TE Connectivity Servies GmbH, Schaffhausen (CH); Measurement Specialties (Chengdu) Ltd., Chengdu (CN); Shenzhen AMI Technology Co, Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,462

(22) Filed: Nov. 15, 2019

(65) Prior Publication Data

US 2020/0094339 A1    Mar. 26, 2020

Related U.S. Application Data

(63) Continuation of application No. PCT/EP2018/062625, filed on May 15, 2018.

(30) Foreign Application Priority Data

May 18, 2017    (CN) .......................... 201710352835.7

(51) Int. Cl.
*B23K 1/00*    (2006.01)
*B23K 3/00*    (2006.01)
(Continued)

(52) U.S. Cl.
CPC .......... *B23K 3/0669* (2013.01); *B23K 1/0016* (2013.01); *B23K 1/08* (2013.01); *B23K 2101/38* (2018.08)

(58) Field of Classification Search
CPC .......... B23K 3/08; B23K 1/08; B23K 3/0646; B23K 3/0653; B23K 1/0016; B23K 1/085;
(Continued)

(56) References Cited

U.S. PATENT DOCUMENTS 4,766,844 A    8/1988    Brewer et al.
5,361,963 A *  11/1994   Ozawa ................. B23K 3/0607
                                                118/256
(Continued)

FOREIGN PATENT DOCUMENTS

JP    01122127 A  *  5/1989    .......... H01L 24/743
JP    9199844 A       7/1997
(Continued)

OTHER PUBLICATIONS

PCT Notification, The International Search Report and the Written Opinion of the International Searching Authority, Intl App No. PCT/EP2018/062625, dated Nov. 12, 2018, 21 pages.
(Continued)

*Primary Examiner* — Erin B Saad
(74) *Attorney, Agent, or Firm* — Barley Snyder

(57) ABSTRACT

A wire automatic soldering system includes a carrier adapted to load an electrical product to be soldered, a robot adapted
(Continued)

to grip and move the carrier on which the electrical product is loaded, a solder paste container containing a solder paste, and a heater configured to heat the solder paste and melt the solder paste into a liquid. The robot moves a plurality of wires of the electrical product into the solder paste container to solder the wires together with the solder paste.

20 Claims, 2 Drawing Sheets

(51) Int. Cl.
    *B23K 3/06*         (2006.01)
    *B23K 1/08*         (2006.01)
    *B23K 101/38*     (2006.01)

(58) Field of Classification Search
CPC ............ B23K 2101/36; B23K 2101/42; B23K 3/0669; B23K 3/0676; B23K 1/0053; B23K 1/008; B23K 1/012; B23K 1/018; B23K 1/06; B23K 1/19; B23K 1/206; B23K 2101/14; B23K 2103/04; B23K 2103/05; B23K 2103/08; B23K 2103/10; B23K 2103/12; B23K 2103/14; B23K 2103/26; B23K 2103/52; B23K 2103/54; B23K 35/262; B23K 3/02; B23K 3/06; B23K 3/0638; B23K 3/0661; B23K 9/02
See application file for complete search history.

(56) References Cited

U.S. PATENT DOCUMENTS

| | | | |
|---|---|---|---|
| 6,257,480 B1 * | 7/2001 | Furumoto | B23K 1/085 228/1.1 |
| 6,273,317 B1 | 8/2001 | Arai et al. | |
| 2009/0236121 A1 * | 9/2009 | Hopkinson | H01B 11/002 174/113 R |
| 2012/0325899 A1 * | 12/2012 | Willemen | B23K 3/0646 228/203 |
| 2015/0108202 A1 | 4/2015 | Deng et al. | |
| 2018/0185946 A1 * | 7/2018 | Degura | H05K 3/34 |

FOREIGN PATENT DOCUMENTS

| | | | | |
|---|---|---|---|---|
| WO | WO-2008067620 A1 * | 6/2008 | | G01J 3/443 |
| WO | WO-2016207971 A1 * | 12/2016 | | H05K 3/3447 |

OTHER PUBLICATIONS

Abstract of JP09199844, dated Jul. 31, 1997, 1 page.

* cited by examiner

WIRE AUTOMATIC SOLDERING SYSTEM

CROSS-REFERENCE TO RELATED APPLICATIONS

This application is a continuation of PCT International Application No. PCT/EP2018/062625, filed on May 15, 2018, which claims priority under 35 U.S.C. § 119 to Chinese Patent Application No. 201710352835.7, filed on May 18, 2017.

FIELD OF THE INVENTION

The present invention relates to a soldering system and, more particularly, to an automatic soldering system for a wire.

BACKGROUND

In manufacturing an electrical device, solder paste, for example, tinol, is often used to solder a lead or pin of the electrical device. The lead or pin of the electrical device is generally soldered manually, for example, an operator usually uses an iron head to heat a solder paste placed on the lead or pin of the electrical device, so that the solder paste is melted and liquefied. After the solder paste is cured, the soldering of the lead or pin of the electrical device is realized. The efficiency of manual soldering, however, is very low. It is only suitable for a task of soldering a single product and not suitable for a task of soldering mass products.

SUMMARY

A wire automatic soldering system includes a carrier adapted to load an electrical product to be soldered, a robot adapted to grip and move the carrier on which the electrical product is loaded, a solder paste container containing a solder paste, and a heater configured to heat the solder paste and melt the solder paste into a liquid. The robot moves a plurality of wires of the electrical product into the solder paste container to solder the wires together with the solder paste.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
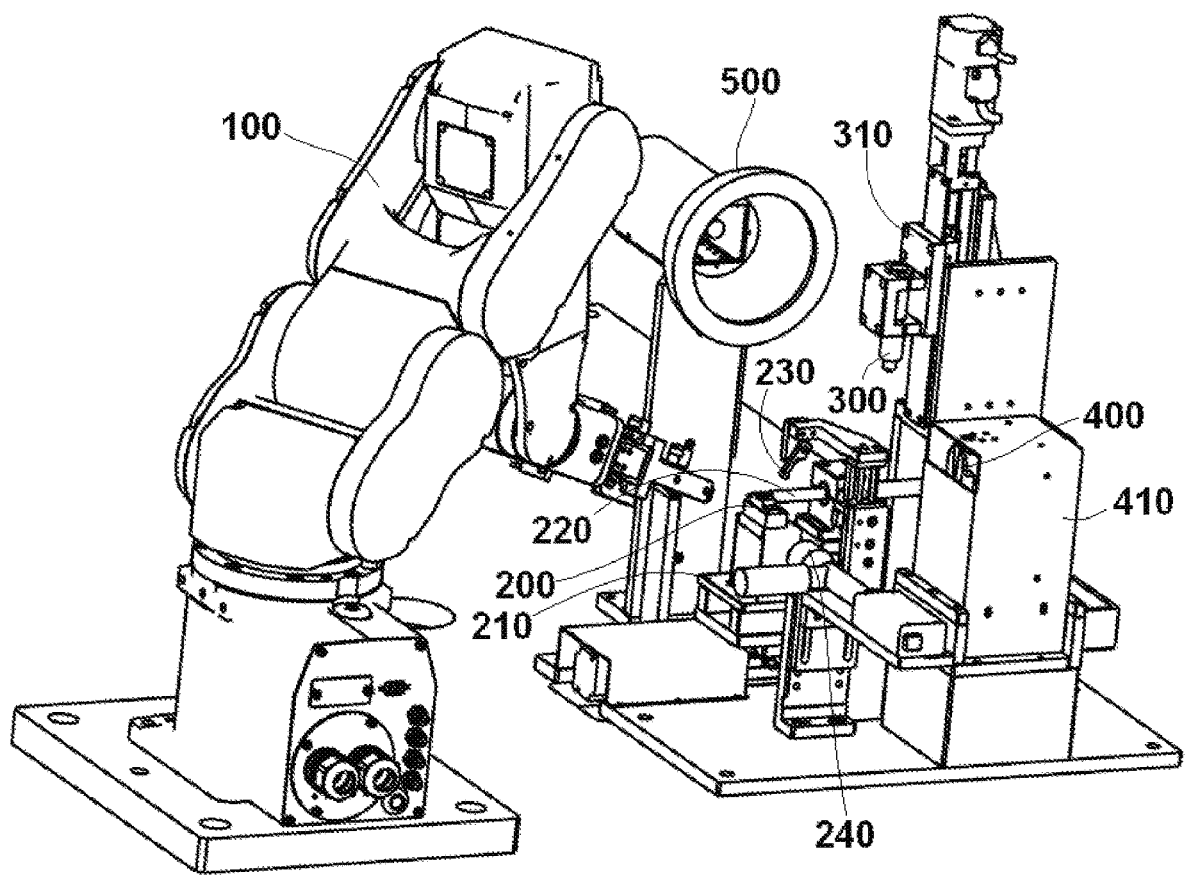
FIG. 1 is a perspective view of a wire automatic soldering system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
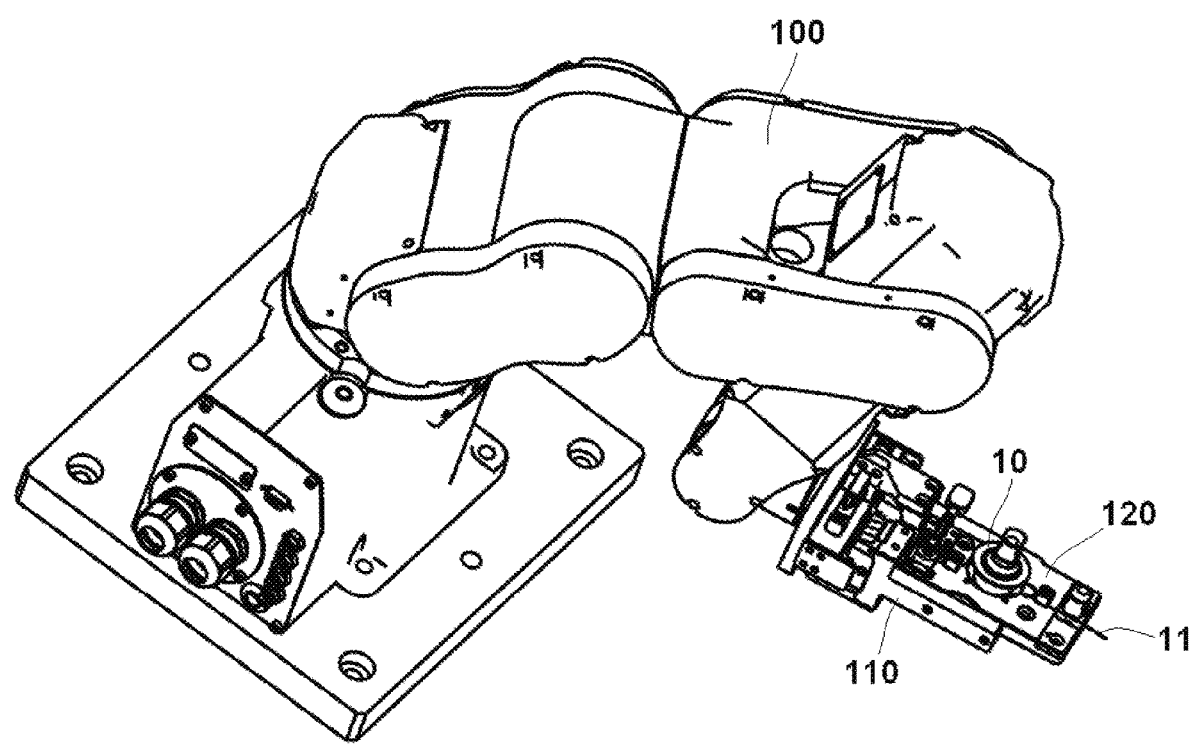
FIG. 2 is a perspective view of a robot of the wire automatic soldering system.

A wire automatic soldering system, as shown in FIG. 1, comprises a carrier 120, a robot 100, a solder paste container 200, and a heater 220. An electrical product 10 to be soldered is loaded on the carrier 120, as shown in FIG. 2. The robot 100 is adapted to grip and move the carrier 120 on which the electrical product 10 is loaded. The solder paste container 200 is contains a solder paste. The heater 220 heats the solder paste contained in the solder paste container 200, so that the solder paste is melted into liquid.

The robot 100, shown in FIGS. 1 and 2, has a plurality of degrees of freedom. The robot 100 is adapted to move wires 11 of the electrical product 10 into the solder paste container 200, so that parts of the wires 11 to be soldered together are immersed in the molten solder paste in the solder paste container 200. In this way, the wires 11 may be soldered together by the solder paste in the solder paste container 200. The robot 100 has a gripper 110 adapted to grip the carrier 120 on which the electrical product 10 is loaded.

As shown in FIG. 2, the electrical product 10 has two wires 11 to be soldered together. The two wires 11 are held side by side and fixed on the carrier 120. As shown in FIG. 2, parts of the wires 11 to be soldered together extend out of the carrier 120 and are adapted to be inserted into the solder paste container 200.

The wire automatic soldering system, as shown in FIG. 1, includes a vision detection system 500. The vision detection system 500 is configured to detect whether an actual soldering length of a soldered part of the wires 11 with the solder paste is equal to or larger than a first predetermined length. If the actual soldering length is less than the first predetermined length, the robot 100 moves the wires 11 into the solder paste container 200 again, so as to further solder the wires 11 until the actual soldering length is equal to or larger than the first predetermined length. The vision detection system 500 is also configured to detect whether an actual soldering quality of the soldered part of the wires 11 conforms to a predetermined soldering quality. If the actual soldering quality does not conform to the predetermined soldering quality, the robot 100 moves the wires 11 into the solder paste container 200 again, so as to further solder the wires 11 until the actual soldering quality meets the predetermined soldering quality.

The wire automatic soldering system, as shown in FIG. 1, includes a cutting mechanism 400. The cutting mechanism 400 is configured to cut off a segment of end portion of the soldered part of the wires 11, so that the length of the soldered part of the wires 11 is equal to a second predetermined length which is less than the first predetermined length.

The vision detection system 500 is also configured to detect whether the length of the soldered part of the wires 11, after the segment of end portion of the soldered part is cut off, is larger than the second predetermined length. If the length of the soldered part of the wires 11, after the segment of end portion of the soldered part is cut off, is larger than the second predetermined length, the robot 100 moves the wires 11 to the cutting mechanism 400 again, so as to cut the soldered part of the wires 11 again until the length of the soldered part of the wires 11 is equal to the second predetermined length.

The wire automatic soldering system, as shown in FIG. 1, includes a waste recycling bin 410. The waste recycling bin 410 is configured to receive the end portion cut off from the wires 11 by the cutting mechanism 400. In an embodiment, the waste recycling bin 410 is positioned below the cutting mechanism 400, so that the end portion cut off from the wires 11 may fall directly into the waste recycling bin 410.

The wire automatic soldering system, as shown in FIG. 1, includes a solder paste syringe 300. The solder paste syringe 300 is configured to inject the solder paste into the solder paste container 200. The solder paste syringe 300, in an embodiment, is an electric syringe, and the amount of solder paste injected by the solder paste syringe 300 in a single injection may happen to fully fill the solder paste container 200.

The wire automatic soldering system, as shown in FIG. 1, includes a first moving mechanism 310. The first moving mechanism 310 is adapted to move the solder paste syringe 300 in a vertical direction to an injection position. An injection port of the solder paste syringe 300 is inserted into the solder paste container 200 when the solder paste syringe 300 is moved to the injection position.

The wire automatic soldering system, as shown in FIG. 1, includes a second moving mechanism 210. The second moving mechanism 210 is adapted to move the solder paste container 200 in a horizontal direction to an injection station. The solder paste container 200 is aligned with the solder paste syringe 300 in the vertical direction when the solder paste container 200 is moved to the injection station.

The wire automatic soldering system, as shown in FIG. 1, includes a cleaning brush 230. The cleaning brush 230 is adapted to remove impurities from a surface of the solder paste in the solder paste container 200. In an embodiment, the impurities may include, for example, oxides floating on the surface of the molten solder paste in solder paste container 200.

The wire automatic soldering system, as shown in FIG. 1, includes a visual inspection system 240. The visual inspection system 240 is configured to inspect whether there are the impurities on the surface of the solder paste in the solder paste container 200. The cleaning brush 230 is controlled to remove the impurities in time once the impurities are inspected by the visual inspection system 240.

A process of the wire automatic soldering system will now be described in greater detail with reference to FIGS. 1 and 2.

First, the electrical product 10 is loaded onto the carrier 120.

Then, the robot 100 grips the carrier 120, on which the electrical product 10 is loaded, with the gripper 110.

Then, the robot 100 moves the electrical product 10, so as to insert the parts of the wires 11 to be soldered into the molten solder paste in the solder paste container 200.

Then, the robot 100 moves the electrical product 100 near the vision detection system 500, and the vision detection system 500 is operated to detect whether an actual soldering length of a soldered part of the wires 11 by the solder paste is equal to or larger than a first predetermined length, and whether an actual soldering quality of the soldered part of the wires 11 conforms to a predetermined soldering quality. If the actual soldering length is less than the first predetermined length or if the actual soldering quality does not conform to the predetermined soldering quality, the robot 100 moves the wires 11 into the solder paste container 200 again, so as to further solder the wires 11 until the actual soldering length is equal to or larger than the first predetermined length and the actual soldering quality meets the predetermined soldering quality.

Then, the cutting mechanism 400 is driven to cut off a segment of end portion of the soldered part of the wires 11.

Then, the vision detection system 500 is operated to detect whether the length of the soldered part of the wires 11 after the segment of end portion of the soldered part is cut off is larger than the second predetermined length; if the length of the soldered part of the wires 11 after the segment of end portion of the soldered part is cut off is larger than the second predetermined length, the robot 100 moves the wires 11 to the cutting mechanism 400 again, so as to cut the soldered part of the wires 11 again until the length of the soldered part of the wires 11 is equal to the second predetermined length.

In this way, the wires 11 of the electrical product 10 are automatically soldered.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A wire automatic soldering system, comprising:
   a carrier adapted to load an electrical product to be soldered;
   a robot adapted to grip and move the carrier on which the electrical product is loaded;
   a solder paste container containing a solder paste;
   a solder paste syringe configured to inject the solder paste into the solder paste container;
   a first moving mechanism adapted to move the solder paste syringe in a vertical direction to an injection position, an injection port of the solder paste syringe is inserted into the solder paste container when the solder paste syringe is moved to the injection position;
   a second moving mechanism adapted to move the solder paste container in a horizontal direction to an injection station, the solder paste container is aligned with the solder paste syringe in the vertical direction when the solder paste container is moved to the injection station; and
   a heater configured to heat the solder paste and melt the solder paste into a liquid, the robot moves a plurality of wires of the electrical product into the solder paste container to solder the wires together with the solder paste.

2. The wire automatic soldering system of claim 1, further comprising a vision detection system configured to detect whether an actual soldering length of a soldered part of the wires is equal to or larger than a first predetermined length.

3. The wire automatic soldering system of claim 2, wherein, if the actual soldering length is less than the first predetermined length, the robot moves the wires into the solder paste container, further soldering the wires until the actual soldering length is equal to or larger than the first predetermined length.

4. The wire automatic soldering system of claim 3, wherein the vision detection system is configured to detect whether an actual soldering quality of the soldered part of the wires conforms to a predetermined soldering quality.

5. The wire automatic soldering system of claim 4, wherein, if the actual soldering quality does not conform to the predetermined soldering quality, the robot moves the wires into the solder paste container, further soldering the wires until the actual soldering quality conforms to the predetermined soldering quality.

6. The wire automatic soldering system of claim 4, further comprising a cutting mechanism configured to cut off a segment of an end portion of the soldered part, so that a length of the soldered part of the wires is equal to a second predetermined length that is less than the first predetermined length.

7. The wire automatic soldering system of claim 6, wherein the vision detection system is configured to detect whether the length of the soldered part of the wires after the segment of the end portion part is cut off is larger than the second predetermined length.

8. The wire automatic soldering system of claim 7, wherein, if the length of the soldered part after the segment of the end portion is cut off is larger than the second predetermined length, the robot moves the wires to the cutting mechanism, cutting the soldered part until the length of the soldered part is equal to the second predetermined length.

9. The wire automatic soldering system of claim 6, further comprising a waste recycling bin configured to receive the end portion cut off from the wires, the waste recycling bin is positioned so that the end portion cut off from the wires falls directly into the waste recycling bin.

10. The wire automatic soldering system of claim 1, wherein the solder paste syringe is an electric syringe.

11. The wire automatic soldering system of claim 10, wherein an amount of solder paste injected by the solder past syringe in a single injection fully fills the solder paste container.

12. The wire automatic soldering system of claim 1, further comprising a cleaning brush adapted to remove impurities from a surface of the solder paste in the solder paste container.

13. The wire automatic soldering system of claim 12, further comprising a visual inspection system configured to inspect whether the impurities are on the surface of the solder paste in the solder paste container.

14. The wire automatic soldering system of claim 13, wherein the cleaning brush is controlled to remove the impurities when the impurities are inspected by the visual inspection system.

15. The wire automatic soldering system of claim 1, wherein the robot has a gripper adapted to grip the carrier on which the electrical product is loaded.

16. The wire automatic soldering system of claim 15, wherein the wires of the electrical product are clamped and fixed on the carrier, a part of the wires to be soldered extends out of the carrier.

17. A wire automatic soldering system, comprising:
a carrier adapted to load an electrical product to be soldered;
a robot adapted to grip and move the carrier on which the electrical product is loaded;
a solder paste container containing a solder paste, the robot adapted to insert a plurality of wires of the electrical product into the solder paste container to solder the wires together with the solder paste;
a solder paste syringe configured to inject the solder paste into the solder paste container;
a first moving mechanism adapted to move the solder paste syringe to an injection position for delivering solder paste into the solder paste container; and
a second moving mechanism adapted to move the solder paste container to an injection station wherein the solder paste container is aligned with the solder paste syringe.

18. The wire automatic soldering system of claim 17, wherein:
the first moving mechanism is adapted to move the solder paste syringe in a vertical direction to the injection position;
an injection port of the solder paste syringe is inserted into the solder paste container when the solder paste syringe is moved to the injection position; and
the second moving mechanism adapted to move the solder paste container to the injection station wherein the solder paste container is aligned with the solder paste syringe in the vertical direction.

19. A wire automatic soldering system, comprising:
an electrical product having two wires to be soldered extending therefrom;
a carrier holding the electrical product and fixing a first portion of the two wires in a side by side position on the carrier, a second portion of the two wires to be soldered extending beyond the carrier;
a vision detection system configured to:
  detect whether an actual soldering length of a soldered part of the wires is equal to or larger than a first predetermined length; and
  detect whether an actual soldering quality of the soldered part of the wires conforms to a predetermined soldering quality;
a solder paste container containing a solder paste;
a robot configured to:
  grip and move the carrier on which the electrical product is loaded;
  insert the two wires of the electrical product into the solder paste container to solder the wires together with the solder paste;
  if the actual soldering length is less than the first predetermined length, move the wires into the solder paste container, further soldering the wires until the actual soldering length is equal to or larger than the first predetermined length; and
  if the actual soldering quality does not conform to the predetermined soldering quality, move the wires into the solder paste container, further soldering the wires until the actual soldering quality conforms to the predetermined soldering quality; and
a cutting mechanism configured to cut off a segment of the soldered part of the two wires so that a length of the soldered part is equal to a second predetermined length that is less than the first predetermined length, wherein the vision detection system is further configured to detect whether the length of the soldered part of the wires after the segment of the soldered part is cut off is larger than the second predetermined length, wherein, if the length of the soldered part after the segment of the soldered part is cut off is larger than the second predetermined length, the robot is further configured to move the wires to the cutting mechanism for cutting the soldered part until the length of the soldered part is equal to the second predetermined length.

20. The wire automatic soldering system of claim 19, further comprising a waste recycling bin configured to receive the segment of the soldered part cut off from the two wires, the cutting mechanism arranged on a sidewall of the waste recycling bin and positioned so that the segment of the soldered part cut off from the two wires falls directly into the waste recycling bin.

* * * * *